United States Patent [19]

Shapland

[11] Patent Number: 4,561,573

[45] Date of Patent: Dec. 31, 1985

[54] VALVE AND REPLACEABLE COLLECTOR NOZZLE

[75] Inventor: James T. Shapland, Champaign, Ill.

[73] Assignee: Flo-Con Systems, Inc., Champaign, Ill.

[21] Appl. No.: 410,010

[22] Filed: Aug. 20, 1982

[51] Int. Cl.$^4$ ............................................. B22D 41/08
[52] U.S. Cl. ................................... 222/600; 222/512; 222/561
[58] Field of Search ............... 222/591, 597, 599, 600, 222/594, 512, 561

[56] References Cited

U.S. PATENT DOCUMENTS

| | | | |
|---|---|---|---|
| 3,760,993 | 9/1973 | Meier | 222/600 |
| 3,841,539 | 10/1974 | Shapland et al. | 222/561 |
| 3,980,271 | 9/1976 | Hind et al. | 251/144 |
| 4,063,668 | 12/1977 | Shapland et al. | 222/512 |
| 4,187,965 | 2/1980 | Aliprandi et al. | 222/600 |
| 4,257,543 | 3/1981 | Muschner et al. | 222/600 |
| 4,327,847 | 5/1982 | Tinnes | 222/591 |
| 4,358,034 | 11/1982 | Hind | 222/600 |

FOREIGN PATENT DOCUMENTS

| | | |
|---|---|---|
| 94813 | 12/1973 | Japan . |
| 1466346 | 3/1977 | United Kingdom . |
| 1469412 | 4/1977 | United Kingdom . |
| 1593371 | 7/1981 | United Kingdom . |

Primary Examiner—Joseph J. Rolla
Assistant Examiner—Michael S. Huppert
Attorney, Agent, or Firm—Jack E. Dominik

[57] ABSTRACT

Replaceable collector nozzle for a sliding gate. A pressure plate is provided with a collar or ring or other engaging element with interior securing connectors, and positioned beneath the sliding plate. The collector nozzle at its upper portion is provided with threads or other engaging connectors to engage the pressure plate connectors. Alternatively an interlock comprising cammed members interior of the ring or collar mate with corresponding members at the upper end of the replaceable collector nozzle when it rotatably engages the interior of the collar or ring. The collector nozzle can then be replaced during temporary shut off by twisting with a typical chain wrench and a new collector nozzle inserted without disturbing the mounted relationship of the remainder of the sliding gate and the top plate interiorly of the valve. In a further embodiment the coupling of the collector nozzle is a thrust-type which does not require rotation.

42 Claims, 10 Drawing Figures

VALVE AND REPLACEABLE COLLECTOR NOZZLE

BACKGROUND OF THE INVENTION

1. Field of Invention

The present invention is directed to a valve and replaceable nozzle. The valve is exemplified in Shapland et al U.S. Pat. No. 4,063,668. More specifically the present invention is directed to the sliding gate portion of such a valve, and a replaceable collector nozzle which may be used on the sliding gate.

2. Prior Art

In utilizing sliding gates of the U.S. Pat. No. 4,063,668, and others such as those of Interstop of Switzerland, attention has been directed to the wear of the collector nozzle which is premature to the wear of the refractory plate portion of the sliding gate. In the prior-art construction the sliding gate is encased in metal, and the metal extends inwardly. In order to utilize a replaceable collector nozzle, a depending skirt surrounds the interior nozzle, and is supplied with formed threads. The collector nozzle is then encased in a metal can, and has formed at its upper portion threads for mating with the skirt portion of the sliding gate.

Also as shown in U.S. Pat. No. 4,314,659, a refractory nozzle can be replaced in the nozzle tube of a movable gate. In this instance, however, the refractory is shaped for insertion and then is rotated to lock. Provision is not made, however, for being able to put mortar on top of the refractory and squeeze it into position by the utilization of a chain wrench or other means for insertion.

Of more recent evolution is the utilization of a pressure plate in connection with the sliding gate of U.S. Pat. No. 4,063,668. The purpose of pressure plate is to more uniformly distribute the loads of the spring pressure pads employed. The pressure plate can be used to distribute the load irrespective of source or location, such as external springs, torque devices, fluid pressure, and the like.

SUMMARY OF THE INVENTION

The present invention is directed to the subject matter of a replaceable collector nozzle for a sliding gate. A pressure plate is provided with a central collar or ring or other engaging means with interior securing means located at a point in line with sliding gate orifice or orifices, and positioned beneath the sliding plate. The collector nozzle at its upper portion is provided with threads or other engaging means to engage the pressure plate engaging means. Alternatively an interlock comprising cammed members interior of the ring or collar mate with corresponding means at the upper end of the replaceable collector nozzle when it rotatably engages the interior of the collar or ring. The collector nozzles can then be replaced during temporary shut off by twisting with a typical chain wrench and a new collector nozzle inserted without disturbing the mounted relationship of the remainder of the sliding gate and the top plate interiorly of the valve. In a further embodiment the coupling of the collector nozzle is a thrust-type which does not require rotation.

In view of the foregoing it is a principal object of the present invention to provide a construction for a removable collector nozzle in a sliding gate valve which secures itself independently of the removal of the sliding gate.

Yet another object of the present invention is to provide a replaceable collector nozzle in a sliding gate valve in which it coacts with a pressure plate, the net result of which is to snugly engage the collector nozzle, pressure plate, and refractory slab of the sliding gate into a unitary construction for operation when the collector nozzle is replaced.

Yet another object of the present invention is to achieve the above objects with a construction which is not only economical to manufacture, but easily replaceable in field usage.

BRIEF DESCRIPTION OF THE DRAWINGS

Further objects and advantages of the present invention will become apparent as the following description of an illustrative embodiment proceeds, taken in conjunction with the accompanying drawings, in which.

DESCRIPTION OF FIRST EMBODIMENT

Figure 1:
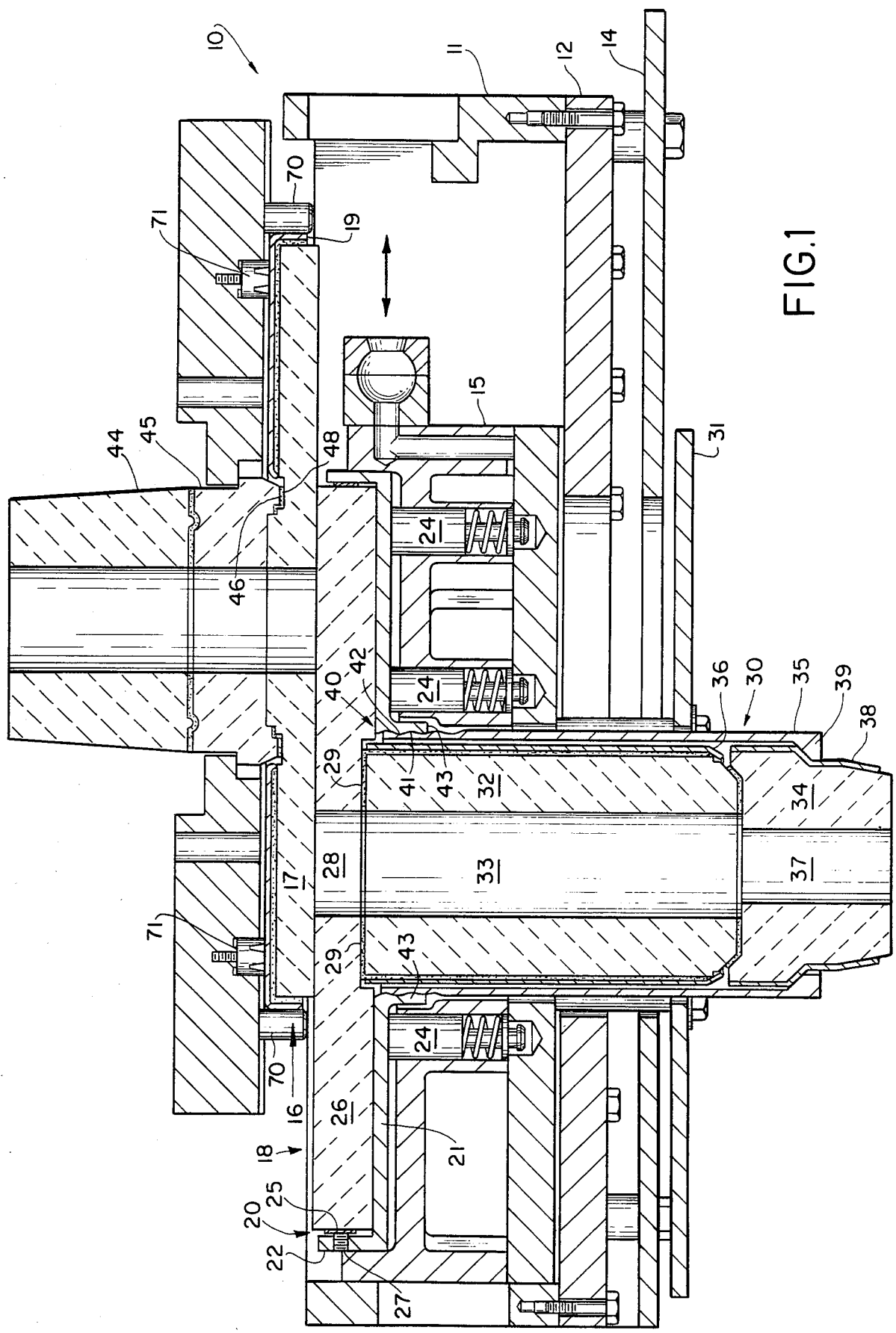
FIG. 1 is a longitudinal sectional view of a sliding gate valve representative of that shown in U.S. Pat. No. 4,063,668 employing a pressure plate in combination with a replaceable collector nozzle illustrative of the present invention.

The valve illustrative of U.S. Pat. No. 4,063,668 is shown in FIG. 1, modified to accomodate a plate and replaceable collector. There it will be seen that the valve 10 is supported by means of a frame 11, having a base plate 12. Beneath the base plate 12, a permanent fixed heat shield 14 is secured.

A carrier 15 is positioned within the frame 11 and actuated (by means not shown) to slide from left to right in a reciprocating fashion as shown in FIG. 1. A slide gate 18 is positioned on top of a pressure plate 20. The pressure plate 20 has a plate base 21 and is surrounded by a pressure plate rim 22. The pressure plate 21 is positioned atop a plurality of spring pads 24. A single band 25 is shown which surrounds the slide plate 26 of the slide plate 18. A lock 27 is provided at a convenient location on the pressure plate rim 22 to lock the slide plate 26 interiorly of the pressure plate 20 and to secure the slide plate 26 against relative motion to the pressure plate 20.

The slide plate 26 shown has a central slide plate orifice 28. Other applications are contemplated where the slide plate 26 may have an offset orifice 28, or more than one orifice 28. The orifice 28 on its underneath side is surrounded by a collector recess 29. A depending ring or collar 43 extends downwardly from the pressure plate 20 and surrounds the collector recess 29. While the pressure plate 20 has been shown engaged by spring pds 24, the pressure plate 20 and collector 30 can be used with pressure fluid pads, or uniform encircling pressure means such as shown in the copending application of Earl P. Shapland executed May 18, 1982 and filed May 24, 1982, Ser. No. 381,063.

Centrally of the unit as shown it will be seen that the replaceable collector assembly 30 can be positioned interiorly of the valve 10, carrier 15, and in abutting relationship with the slide plate 26. A movable splatter shield 31 is provided in surrounding relationship to the collector assembly 30 and shifts with the sliding gate and its associated collector assembly 30.

In the embodiment shown in FIG. 1 provision is made for two collector refractories, the first being the upper collector refractory 32 having an orifice 33, and a lower collector refractory 34 having an orifice 37 which may be different than upper orifice 33. Also the lower collector refractory 34 may be of a different refractory material than the upper collector refractory 32. Both refractories are secured by means of the collector retainer 35. In addition a jacket 36 is provided for the upper collector refractory element 32; and a separate jacket 38 is provided for the lower collector refractory 34. A collar 39 on the lower portion of the collector retainer 35 engages the offset of the jacket 38 which fits over the offset of the refractory 34 and secures and aligns both of the refractory elements 32, 34 interiorly of the collector retainer 35.

In order to removably secure the collector 30, a thread assembly 40 is provided at its upper portion and and in pouring relationship to the slide plate 26. Provision is made for a thread 41 at the upper portion of the collector retainer 35. Mating threads 42 are provided on the depending ring 43 of the pressure plate base 21. Used interchangeably here is the term ring or collar for the member depending from the pressure plate base 21 used to engage the collector retainer 35.

Figure 10:
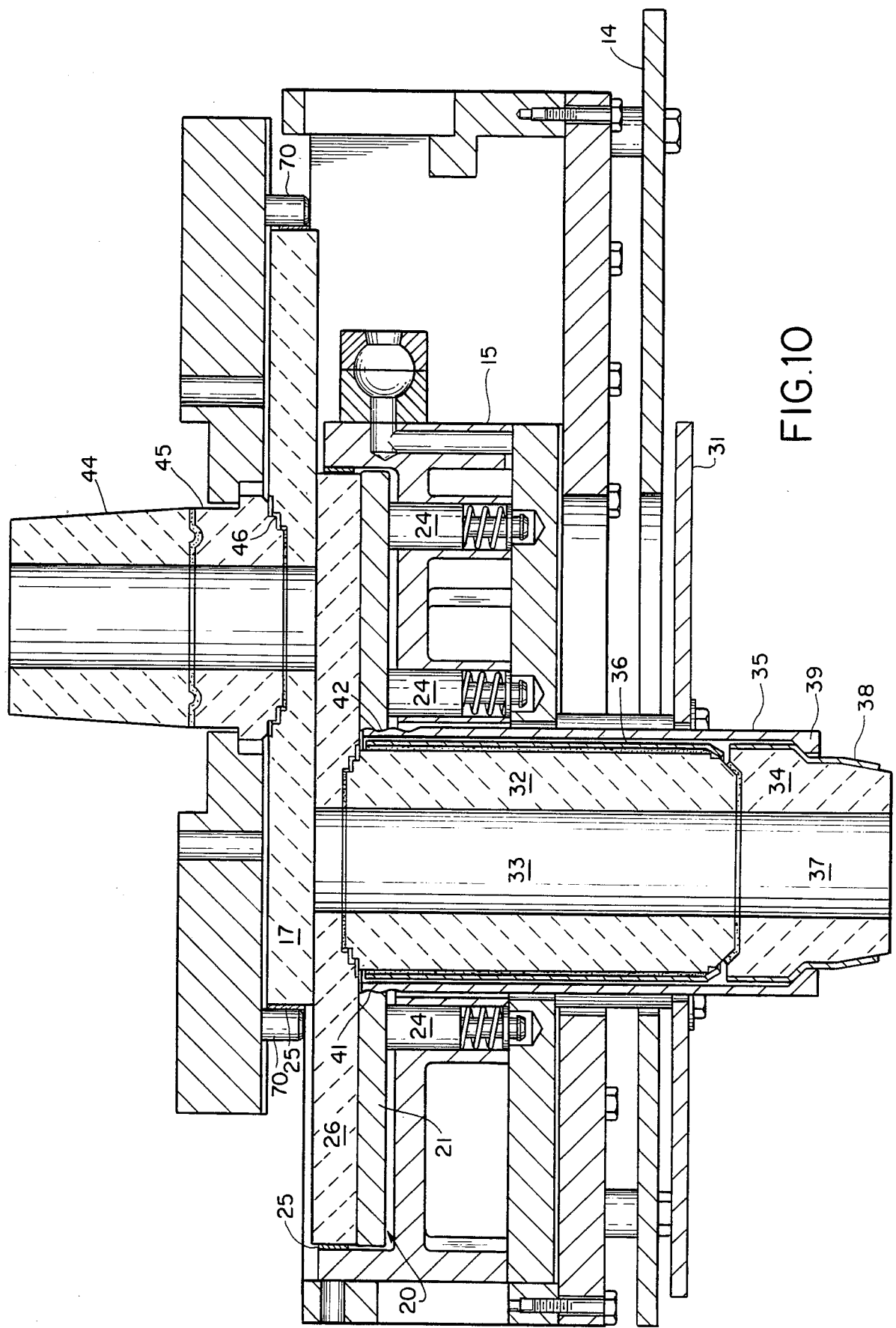
FIG. 10 shows an alternative longitudinal sectional view in which a flat pressure plate is employed without the upstanding pressure plate rim as shown in the embodiment in FIG. 1 and where the carrier restrains the ends of the sliding gate to prevent the same from moving longitudinally due to friction resulting at the interface of the two refractory plates. In this embodiment the sliding gate connection to the upper portion of the collector is the same as the top plate, so that the top plate refractory can be used as the sliding gate refractory. The restraining means permit vertical movement of the sliding gate.

As an additional element of the environment it should be noted that the upper well nozzle 44 and the lower well nozzle 45, as an assembly, terminate at their lower portion in a top plate seat 46. A well nozzle seat 48 is provided at the upper portion of the top plate refractory 17 to engage the top plate seat 46. As will be set forth hereinafter, it is contemplated (as shown in FIG. 10 to be described later) that an alternative embodiment of the collector assembly 30 will terminate at its upper face with a configuration substantially identical to the top plate seat 46, and that the collector recess 29 will be the same as the well nozzle seat 48 on the top plate to the end that the top plate and the sliding gate can be the same refractory.

Figure 2:
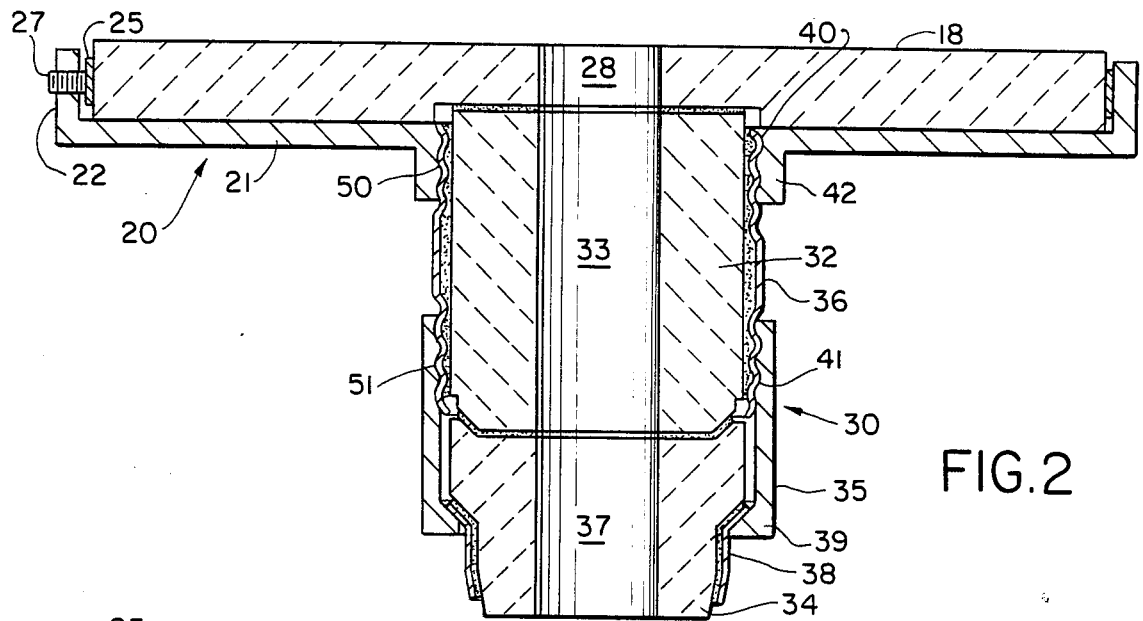
FIG. 2 is a longitudinal sectional view of the sliding gate, and replaceable collector showing a first alternative replaceable collector.

Turning now to FIG. 2, it will be seen that the collector nozzle assembly 30 is modified from that construction shown in FIG. 1 primarily by the provision of an upper thread 50 on the upper refractory jacket 36. In addition a lower thread 51 is provided on the jacket 36 for the upper refractory and threadably engages the collector retainer 35 which bridges and secures the two refractories at the upper portion of the lower collector refractory 34 and the lower portion of the upper collector refractory 32. The common elements of the embodiment of FIG. 2 are shown by the same reference numerals as FIG. 1.

Figure 3:
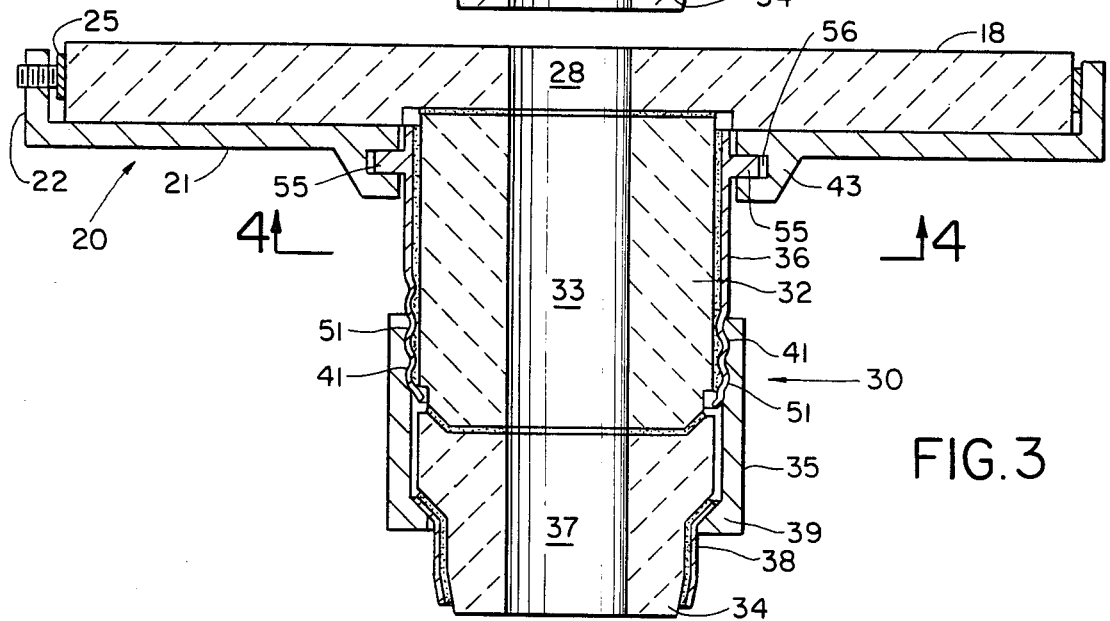
FIG. 3 is a view comparable to FIG. 2 showing yet another alternative embodiment of the replaceable collector.
Figure 4:
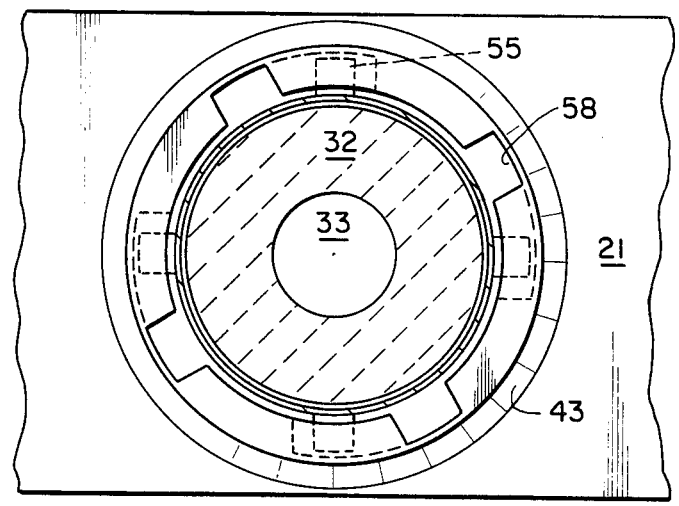
FIG. 4 is a transverse sectional view of the embodiment shown in FIG. 3 taken along section line 4—4 of FIG. 3.

A further embodiment of the collector nozzle 30 is shown in FIGS. 3 and 4. It differs primarily from the previous two embodiments in the provision of a plurality of ears 55 secured to the upper portion of the upper refractory jacket 36. The ears 55 ride against a cammed ear slot 56. Insertion is provided for by a plurality of insert notches 58 interrupting the ear slots 56 as shown in FIG. 4.

Figure 5:
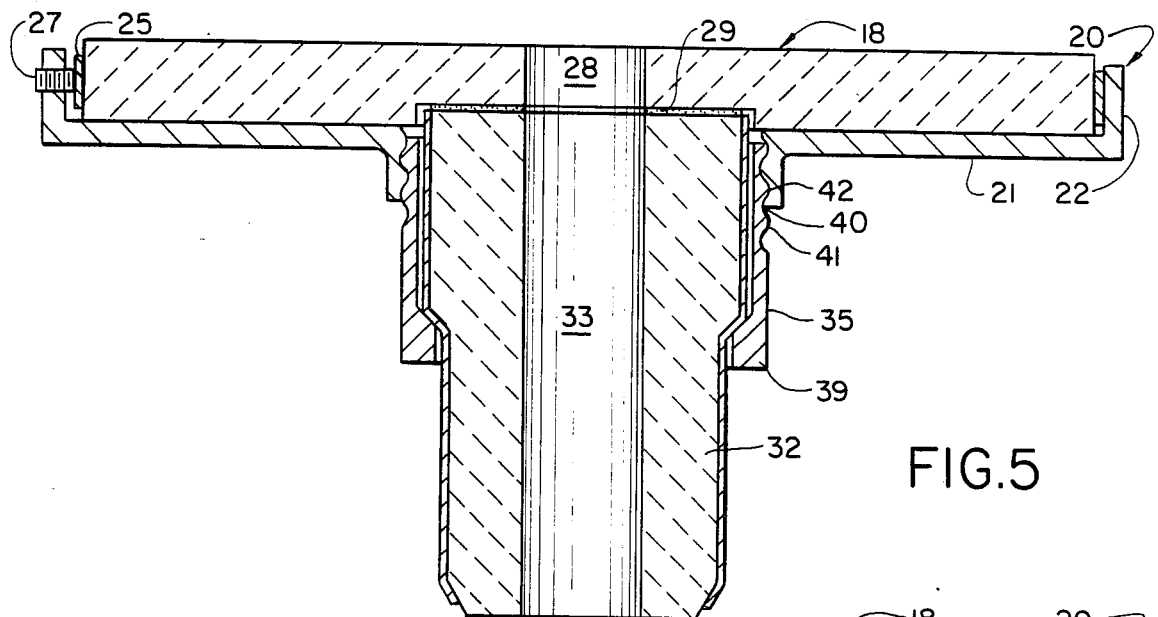
FIG. 5 is yet another sectional view of an additional embodiment in which a one-piece refractory is employed in the replaceable collector.

The embodiment shown in FIG. 5 utilizes a single refractory nozzle 32; otherwise being substantially identical with the embodiment shown in FIG. 1. At this point it should be noted that a retainer connector 35 has been employed in all of the embodiments thus far described of the replaceable collector nozzle 30.

Figure 6:
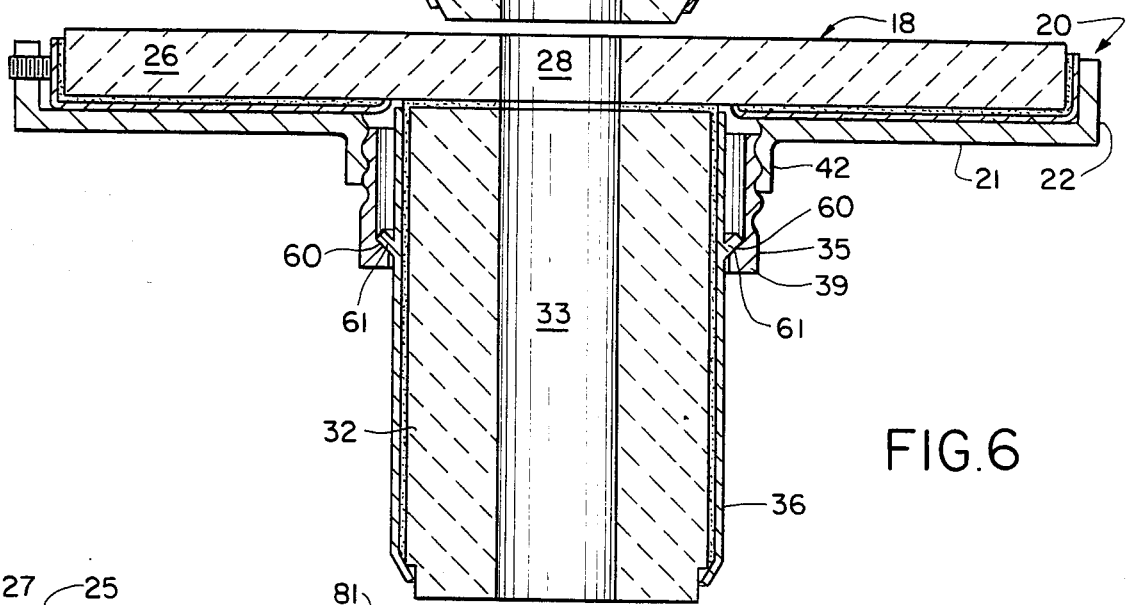
FIG. 6 is yet another sectional view of an embodiment using a single refractory replaceable collector in which the bottom of the slide gate is planar.

In the embodiment shown in FIG. 6 the interior frustoconical face of the collar 39 is provided interiorly of the retainer 35 adjacent the collar portion 39 thereof. Extending from the jacket 36 is a ring or set of tab hangers 61. The slide plate 26 is shown without a recess where it engages the collector refractory.

Figure 7:
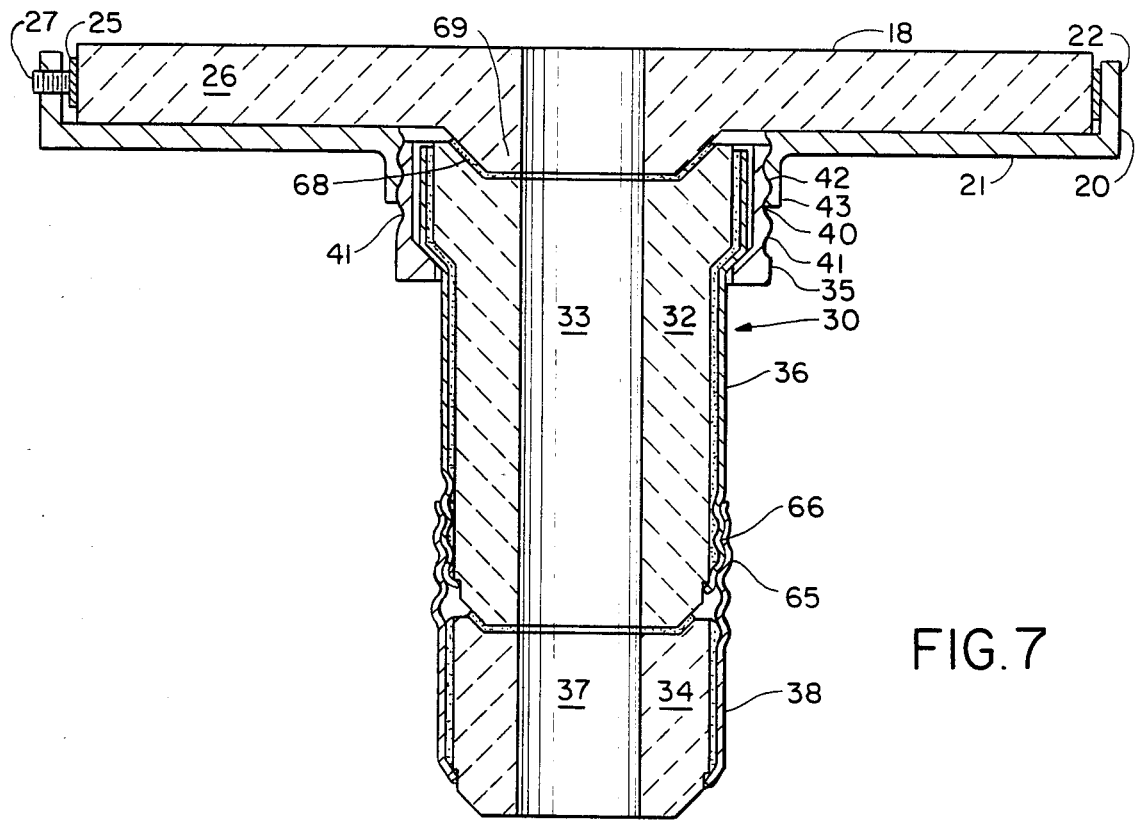
FIG. 7 is still a further sectional view of another embodiment of two-piece refractory collector.

A further embodiment of the collector nozzle assembly 30 appears in FIG. 7. There it will be seen that the upper refractory 32 and lower refractory 34 are joined by a thread assembly comprising lower jacket threads 65 and upper jacket threads 66. The retainer 35 engages the depending ring 43 as in the other embodiments, however the retainer 35 and its collar 39 engage an offset portion of the upper refractory jacket 36. This embodiment further shows a recess 68 in the upper refractory 32 which mates with a depending extension 69 of the slide gate refractory 26.

Figure 8:
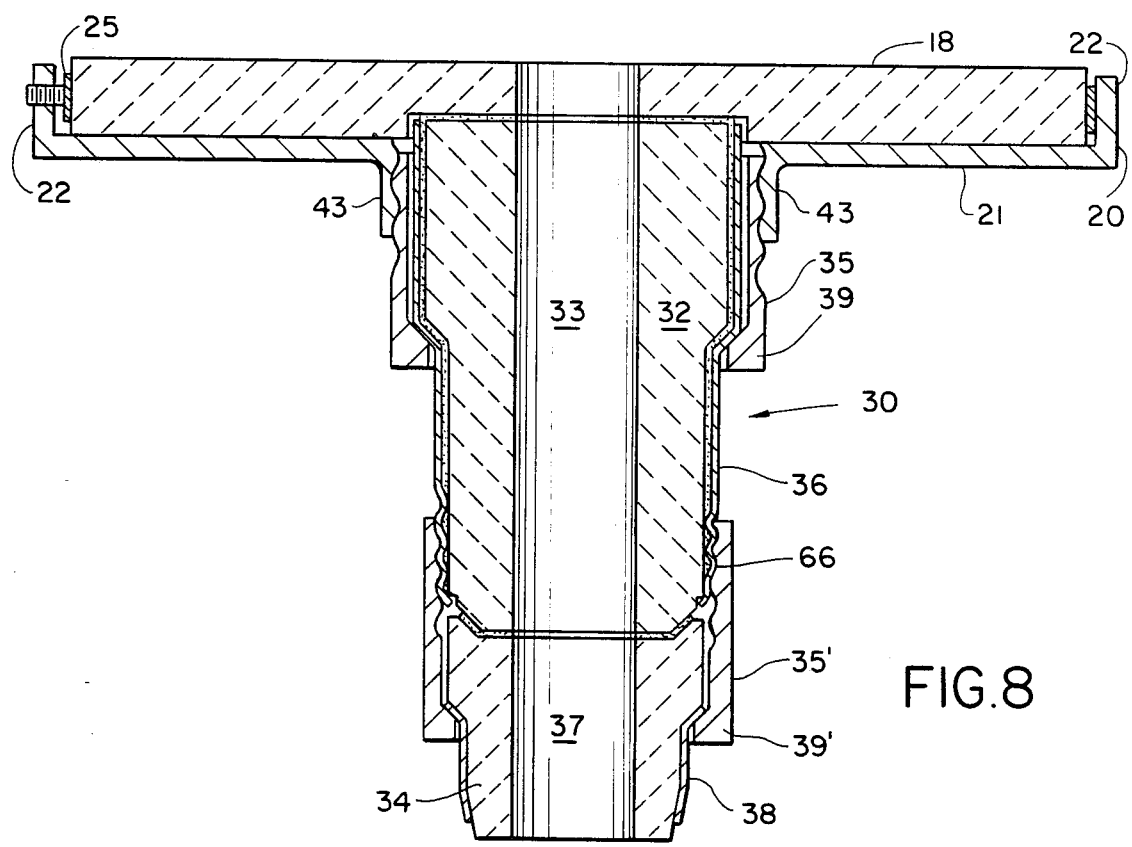
FIG. 8 is yet another illustrative sectional view of an alternative embodiment utilizing two refractory members in the collector.

FIG. 8 shows a further embodiment of the collector nozzle 30 in which two retainers 35, 35' are employed. In each instance the retainers 35, 35' have respective collars 39, 39' which engage tapered portions of their respective refractory jackets 36, 38. The lower retainer 35' engages upper jacket threads 66 to secure the two refractory members 32, 34 in joined relationship.

Figure 9:
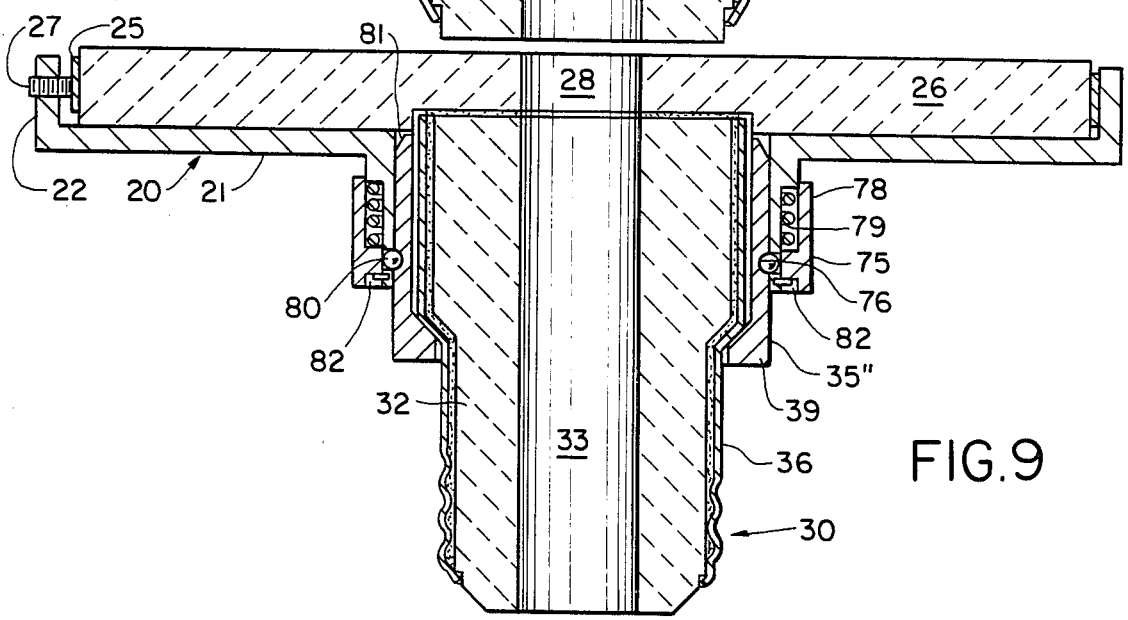
FIG. 9 shows an alternative coupling of the collector nozzle to the pressure plate having a ball-type coupler.

FIG. 9 shows a further embodiment of the collector nozzle 30 in which a coupler 75 of the push type is shown and in which the connection is accomplished without rotating. The retainer 35" has a ball recess 76 in the form of a ring groove. A coupler ring 78 surrounds the coupler spring 79 which together hold the coupler balls 80. When the nozzle is inserted the top is mortared and then pressed in place. Prior to insertion the ring 78 is pressed against the pressure of spring 79. The tapered top 81 of the retainer 35" first depresses the balls 80 until they engage the ball recess 76 of the retainer 35". To remove, the coupler ring 78 is shifted upwardly to compress spring 79 and permit the balls 80 to come out of recess 76 and be positioned in the ball pocket 82 of the coupler 75 and the collector 30 is then replaced. The various refractory shapes and combinations shown in FIGS. 1–8 and 10 can be adapted to the subject coupler 75.

In the embodiment shown in FIG. 10, it will be seen that the pressure plate ring 22 has been omitted. The carrier 15 has been modified to retain the sliding refractory 26. The pressure plate 20 has central threads 42 which directly engage the upper threads 41 of the retainer 35. Also to be noted is that the upper portion of the upper collector refractory 32 is a modified configuration which is identical to the lower well nozzle 45 top plate seat 46. With this configuration the top plate refractory 17 may be identical with the slide plate 26. The top plate 16 also has a top plate band 25. While the top plate 16 shown does not have metal encasement 19, it may in some applications as shown in FIG. 1. Where metal encasement is employed, desirably magnets 71 (see FIG. 1) are used to temporarily hold the top plate 16. In all applications shown, retaining pins 70 are employed to locate the top plate 16. Also the slide gate 26 may or may not be encased in metal as the top plate discussed above.

In review it will be seen that several embodiments of a replaceable collector nozzle 30 have been shown and described in their varying relationships with a spring plate 20. The sliding gate refractory 26 may or may not require a lower metallic element. The sliding gate refractory is preferably banded, however, to accomodate cracking which normally takes place during the thermal shock of a typical pour. Also it will be noted that in one embodiment, FIG. 10, there has been shown the utilization of a single refractory which is both the top plate and the sliding gate. In all instances the collector 30 can be removed and replaced by a simple tool, or in some instances, without a tool.

The method involved in replacing the collector nozzle requires the use of a pressure plate. The pressure plate is positioned adjacent the pair of refractories including the stationary top plate and the sliding gate. The pair of refractories are urged into face-to-face contact by pressure means such as springs bearing upwardly on the pressure plate which in turn bears upwardly against the lower plate of sliding gate. Where two or more collector nozzles are employed, the method remains the same. Although more than two collector nozzles are unlikely to be used with a reversible slide gate as shown, this method is also applicable to rotary gates where additional nozzles may be used.

The sliding gate and pressure plate are secured against relative motion. Thereafter the collector nozzle is removed and replaced by disconnecting it from its connection with the pressure plate. The rotary fit permits the pressure of the collector refractory against the slide gate to reinforce the point at the orifice connection. The disengaging is accomplished by rotating the collector nozzle in those instances where rotary-type connection is employed. In those instances where push-type connection is employed, or bayonet fastener, the collector nozzle is pushed into position and secured against the pressure plate.

Desirably in any of the alternatives for replacing the collector nozzle, mortar is applied at the upper refractory face and after the pressure engagement has been established between the collector nozzle and the sliding plate, the same cures for use. When the lower surface of the plate and the upper surface of the nozzle are properly prepared, the use of mortar may be unnecessary.

Although particular embodiments of the invention have been shown and described in full here, there is no intention to thereby limit the invention to the details of such embodiments. On the contrary, the intention is to cover all modifications, alternatives, embodiments, usages and equivalents of a valve and replaceable collector nozzle as fall within the spirit and scope of the invention, specification and the appended claims.

I claim:

1. A sliding gate valve and replaceable collector nozzle comprising, in combination a sliding gate valve having a stationary plate, a sliding gate, and means for securing the stationary plate and sliding gate in pressure relationship and in teeming relationship with an orifice at a lower portion of a teeming vessel, the means for securing the stationary plate and sliding gate in pressure relationship being beneath the sliding gate, an independent spring loaded metallic pressure distribution plate for aligning independent refractory members, each member having a teeming opening, one such member being a collector nozzle, the pressure distribution plate having an annulus proportioned to receive a collector nozzle, said pressure distribution plate being positioned between the sliding plate and the means for securing the sliding gate and stationary plate in pressure relationship and in non-sliding relationship to the sliding gate, a collector nozzle holding means on the pressure plate adjacent said annulus, a replaceable collector nozzle, and engaging means at the upper portion of the collector nozzle for engaging with the pressure plate collector nozzle holding means.

2. In the combination of claim 1, wherein the engaging means on the removable collector nozzle are opposed cammed ears secured to the upper portion of the collector nozzle, the cam means has a cam face at their lower portion thereof, said pressure plate having opposed cammed recesses for mating engagement with the cammed extensions of the replaceable collector nozzle.

3. In the combination of claim 1, wherein the collector engaging means are threads.

4. In the combination of claim 1 wherein the collector engaging means include a coupler.

5. A replaceable collector nozzle for use in a sliding gate valve having a movable plate and a stationary plate, and an independent spring loaded pressure distribution plate for aligning and pressurizing independent refractory members and positioned in non-sliding relationship to the movable plate, each member having a teeming opening, one such member being a collector nozzle, said movable plate having a central lower face for abuttingly engaging the upper face of a replaceable collector nozzle with said face in surrounding relationship to the teeming opening in said movable plate, comprising a collector nozzle characterized by a metallic encasement retaining the refractory portion of the collector nozzle, the upper end of the collector nozzle refractory being shaped for abutting relationship with the lower portion face of the movable plate, a metallic pressure plate engaging means at the upper portion of the collector nozzle metallic encasement, said pressure plate engaging means being proportioned for engaging the pressure plate collector nozzle holding means thereby removably replacing the subject collector nozzle in the sliding gate valve.

6. In the replaceable collector of claim 5,
two jacketed refractory members, the lower of which has an offset,
a retainer engaging the lower refractory offset,
the means for engaging being at the upper portion of said retainer.

7. In the replaceable collector of claim 6,
a jacketed refractory member, the lower portion of which has a circular offset,
a retainer having a collar engaging said lower refractory circular offset,
and means at the upper end of the retainer for engaging the pressure plate.

8. In the replaceable collector of claim 7, wherein
the retainer pressure plate engaging means are threads.

9. In the replaceable collector nozzle of claim 7, wherein
the retainer pressure plate engaging means are extended lugs.

10. In the replaceable collector nozzle of claim 5, wherein
the collector nozzle encasement has thrust couple engaging means at its upper portion.

11. A metallic pressure plate for use with a sliding gate valve having refractory members in sliding pressure face to face relationship, comprising
an independent spring load metallic pressure distributin plate for aligning and pressurizing independent refractory members, each member having a teeming opening, one such member being a collector nozzle,
said pressure plate having means for being secured in pressure non-slidable relationship with a sliding gate,
and collector nozzle holding means surrounding said opening on the plate for securing the upper portion of a replaceable collector nozzle.

12. In the pressure plate of claim 11,
wherein the holding means are threads.

13. In the pressure plate of claim 11,
wherein the holding means are circular supports having ear slots proportioned to receive ears at the upper portion of the replaceable collector.

14. In the pressure plate of claim 11,
wherein the holding means is a thrust-type coupler.

15. In the pressure plate of claim 11,
a collar depending from pressure plate opening,
and collector nozzle holding means on the collar.

16. A replaceable collector nozzle for use in a sliding gate valve of the type having a sliding gate and a stationary plate, and a metallic pressure plate beneath said slide gate in non-sliding relationship to the sliding gate comprising a collar with interior engagement means in surrounding relation to a collector receiving opening in said pressure plate,
said collector nozzle having a metallic encasement retaining the refractory portion of the collector nozzle,
pressure plate engaging means at the upper portion of the collector nozzle metallic encasement,
said collector nozzle pressure plating engaging means being proportioned for engaging the pressure plate collar with interior engagement means of the sliding gate valve for thereby removably replacing the subject collector nozzle in the valve.

17. In the collector of claim 16,
the engaging means being threads.

18. In the collector of claim 16,
the engaging means being ears.

19. In the collector of claim 16,
the engaging means being a thrust-type coupler engaging the collar.

20. The method of replacing a collector nozzle in a sliding gate valve having a sliding plate and stationary plate each with a teeming orifice and in which the two plates are urged into face to face contact by a pressure means bearing upwardly against the lower plate including the steps of
positioning an independent spring load metallic pressure distribution plate for aligning and pressurizing indpendent refractory members, each member having a teeming opening, one such member being a collector nozzle to be secured beneath and in abutting face to face relationship with the sliding plate, and said independent spring load pressure distribution plate having an opening with collector connector means surrounding the opening,
securing the sliding gate and pressure plate against relative motion,
removing a worn collector nozzle removably secured to the sliding gate pressure plate,
replacing a new collector by inserting the same into the pressure plate.

21. In the method of claim 20, the additional step of applying mortar to the upper portion of the replacement collector before inserting the same in the pressure plate collar.

22. A sliding gate valve and replaceable collector nozzle comprising, in combination
a sliding gate valve having a stationary plate, a sliding gate, and means for securing the stationary plate and sliding gate in pressure relationship and in teeming relationship with an orifice at a lower portion of a teeming vessel,
the means for securing the stationary plate and sliding gate in pressure relationship being beneath the sliding gate,
an independent removably secured metallic pressure distribution plate for aligning independent refractory members, each member having a teeming opening, one such member being a collector nozzle,
the pressure distribution plate having an annulus proportioned to receive a collector nozzle,
said pressure distribution plate being positioned between the sliding gate and the means for securing the sliding gate and stationary plate in pressure relationship and in non-sliding relationship to the sliding gate,
a collector nozzle holding means on the pressure plate adjacent said annulus,
a replaceable collector nozzle,
and engaging means at the upper portion of the collector nozzle for engaging with the pressure plate collector nozzle holding means.

23. In the combination of claim 22, wherein
the engaging means on the removable collector nozzle are opposed cammed ears secured to the upper portion of the collector nozzle, the cam means has a cam face at their lower portion thereof, said pressure plate having opposed cammed recesses for mating engagement with the cammed extensions of the replaceable collector nozzle.

24. In the combination of claim 22, wherein
the collector engaging means are threads.

25. In the combination of claim 22, wherein
the collector engaging means include a coupler.

26. A replaceable collector nozzle for use in a sliding gate valve having a movable plate and a stationary plate, and an independent removably secured metallic pressure distribution plate for aligning and pressurizing independent refractory members and in non-sliding engagement with one of those refractory members and out of contact with the other refractory member, each member having a teeming opening, one such member being a collector nozzle, said movable plate having a central lower face for abuttingly engaging the upper face of a replaceable collector nozzle with said face in surrounding relationship to the teeming opening in said movable plate, comprising a collector nozzle characterized by a metallic encasement retaining the refractory portion of the collector nozzle, the upper end of the collector nozzle refractory being shaped for abutting relationship with the lower portion face of the movable plate, metallic pressure plate engaging means at the upper portion of the collector nozzle metallic encasement, said metallic pressure plate engaging means being proportioned for engaging the pressure plate collector nozzle holding means thereby removably replacing the subject collector nozzle in the sliding gate valve.

27. In the replaceable collector of claim 26,
two jacketed refractory members, the lower of which has an offset, a retainer engaging the lower refractory offset, the means for engaging being at the upper portion of said retainer.

28. In the repalceable collector of claim 26,
a jacketed refractory member, the lower portion of which has a circular offset, a retainer having a collar engaging said lower refractory circular offset, and means at the upper end of the retainer for engaging the pressure plate.

29. In the replaceable collector of claim 28, wherein
the retainer pressure plate engaging means are threads.

30. In the replaceable collector nozzle of claim 28, wherein
the retainer pressure plate engaging means are extended lugs.

31. In the replaceable collector nozzle of claim 26, wherein
the collector nozzle encasement has thrust coupling engaging means at its upper portion.

32. A metallic pressure plate for use with a sliding gate valve having refractory members in sliding pressure face to face relationship, one such refractory member being stationary and the other being slidably movable against the stationary member, comprising an independent removably secured metallic pressure distribution plate for aligning and pressurizing independent refractory members, each member having a teeming opening, one such member being a collector nozzle, said pressure distribution plate being positioned in non-sliding relationship with the sliding one of said refractory members, and metallic collector nozzle holding means surrounding said opening on the pressure plate for securing the upper portion of a replaceable collector nozzle against one of said refractory members.

33. In the pressure plate of claim 32,
wherein the holding means are threads.

34. In the pressure plate of claim 32,
wherein the holding means are circular supports having ear slots proportioned to receive ears at the upper portion of the replaceable collector.

35. In the pressure plate of claim 32,
wherein the holding means is a thrust-type coupler.

36. In the pressure plate of claim 32,
a collar depending from pressure plate opening,
and collector nozzle hodling means on the collar.

37. A replaceable collector nozzle for use in a sliding gate valve of the type having a sliding gate and a stationary plate, and a removably secured independent metallic pressure plate beneath said slide gate and in non-sliding relationship to the sliding gate comprising a metallic collar with interior engagement means in surrounding relation to a collector receiving opening in said pressure plate, said collector nozzle having a metallic encasement retaining the refractory portion of the collector nozzle, pressure plate engaging means at the upper portion of the collector nozzle metallic encasement, said collector nozzle pressure plate engaging means being proportioned for engaging the pressure plate collar with interior engagement means of the sliding gate valve for thereby removably replacing the subject collector nozzle in the valve.

38. In the collector of claim 37,
the engaging means being threads.

39. In the collector of claim 37,
the engaging means being ears.

40. In the collector of claim 37,
the engaging means being a thrust-type coupler engaging the collar.

41. The method of replacing a collector nozzle in a sliding gate valve having a sliding plate and stationary plate each with a teeming orifice and in which the two plates are urged into face to face contact by a pressure means bearing upwardly against the lower plate including the steps of positioning an independent removably secured metallic pressure distribution plate for aligning and pressurizing independent refractory members, each member having a teeming opening, one such member being a collector nozzle to be secured beneath and in abutting face to face relationship with the sliding plate, and said indpendent removably secured pressure distribution plate having an opening with collector connector means surrounding the opening, securing the sliding gate and pressure plate against relative motion, removing a worn collector nozzle removably secured to the sliding gate pressure plate, replacing a new collector by inserting and securing the same into the pressure plate collector connector means into face to face contact with sliding plate.

42. In the method of claim 41, the additional step of applying mortar to the upper portion of the replacement collector before inserting the same in the pressure plate collar.

* * * * *